United States Patent
Raff

[19]

[11] Patent Number: 5,996,272
[45] Date of Patent: Dec. 7, 1999

[54] MULTI-PURPOSE CONTAINER FOR THE ORGANIZATION OF TACKLE AND OTHER ITEMS

[76] Inventor: William Paul Raff, 49 Lancaster Rd., Glastonbury, Conn. 06033

[21] Appl. No.: 08/971,282

[22] Filed: Nov. 17, 1997

Related U.S. Application Data

[63] Continuation-in-part of application No. 08/612,102, Mar. 7, 1996, abandoned.

[51] Int. Cl.[6] .................................................. A01K 97/00
[52] U.S. Cl. ..................... 43/54.1; 43/57.1; 206/315.11
[58] Field of Search ................................... 43/54.1, 57.1; 206/315.11; 220/23.2, 293, 288

[56] References Cited

U.S. PATENT DOCUMENTS

| | | | |
|---|---|---|---|
| 899,466 | 9/1908 | O'Leary | 206/315.11 |
| 2,264,744 | 12/1941 | Dunnam | 43/54.1 |
| 2,765,576 | 10/1956 | Kurek | 43/54.1 |
| 3,128,137 | 4/1964 | Dokter | 206/315.11 |
| 3,751,845 | 8/1973 | Van Leeuwen | 43/57.1 |
| 4,128,170 | 12/1978 | Elliott | 43/54.1 |
| 4,353,182 | 10/1982 | Junkas | 43/54.1 |
| 4,759,148 | 7/1988 | Love | 43/54.1 |
| 4,845,881 | 7/1989 | Ward | 43/54.1 |
| 4,856,647 | 8/1989 | Dahne | 220/23.2 |
| 4,958,730 | 9/1990 | Bunten | 206/315.11 |
| 4,999,943 | 3/1991 | Crabtree | 43/54.1 |
| 5,125,183 | 6/1992 | Tisdell | 43/54.1 |
| 5,271,520 | 12/1993 | McAfee | 206/315.11 |
| 5,303,500 | 4/1994 | Luukonen | 43/54.1 |
| 5,319,877 | 6/1994 | Hagan | 43/54.1 |
| 5,337,892 | 8/1994 | Zaffina | 43/54.1 |
| 5,471,779 | 12/1995 | Downey | 43/54.1 |
| 5,638,976 | 6/1997 | Arnold | 220/293 |

Primary Examiner—Kurt Rowan

[57] ABSTRACT

In a multipurpose container, a primary receptacle defines an interior area, and includes a top portion, a bottom surface and upstanding sidewalls extending from the bottom surface. At least one compartment is removably attached to the exterior surface of the upstanding sidewalls. A lid is provided and is removably attached to the top section of the primary receptacle, to enclose the interior area. A cushion is attached to the lid, and allows the multipurpose container to be used as a seat.

14 Claims, 7 Drawing Sheets

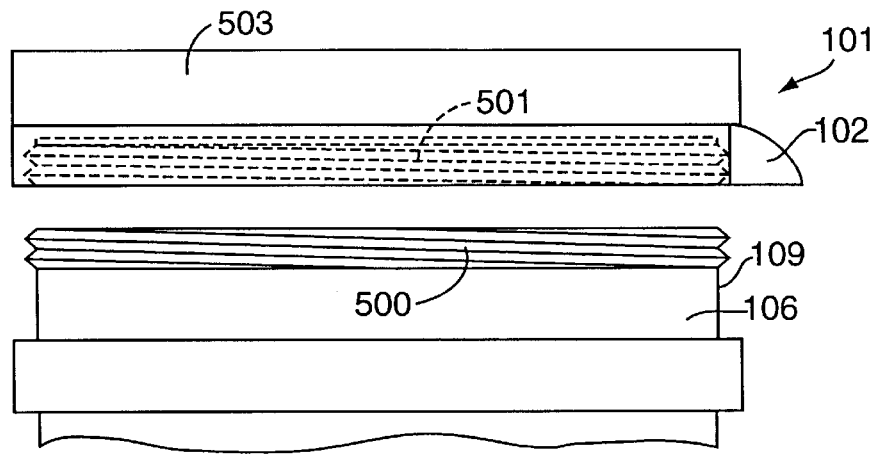
FIG. 9
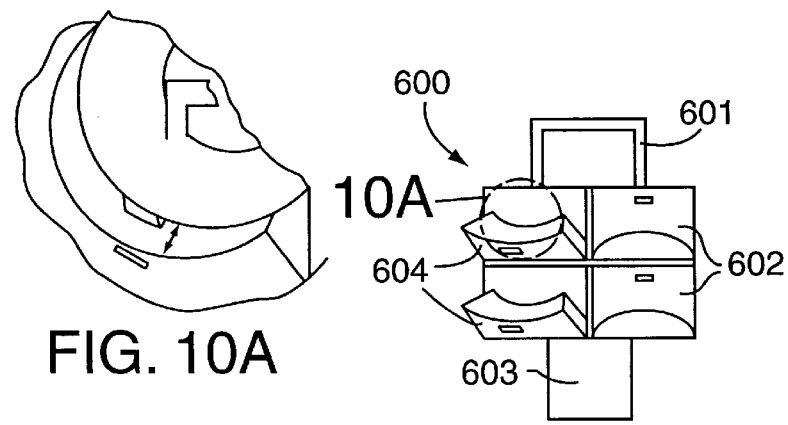
FIG. 10A
FIG. 10
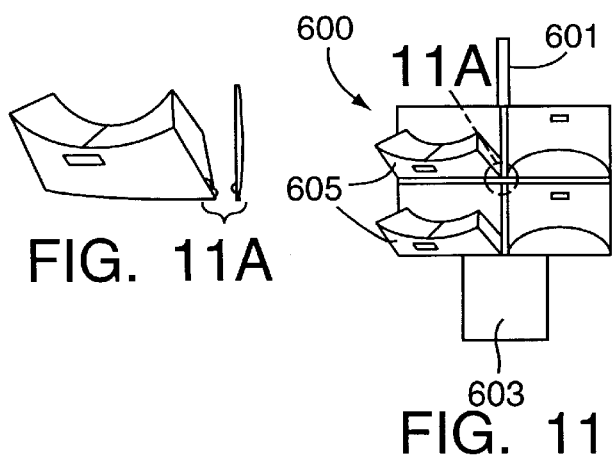
FIG. 11A
FIG. 11

MULTI-PURPOSE CONTAINER FOR THE ORGANIZATION OF TACKLE AND OTHER ITEMS

This is a continuation-in-part of application Ser. No. 08/612,102 filed on Mar. 7, 1996 now abandoned.

I. FIELD OF THE INVENTION

The present invention relates to fishing but more specifically the organization and storage of tackle and other essential accouterments.

II. STATEMENT OF PROBLEM

During fishing trips to various ponds, lakes, rivers, and salt water bodies, it has become evident that one does not seem to possess enough arms and hands to carry the desired fishing paraphernalia. With procurement of tackle, bait, food, beverage and the need for a place to sit one ends up carrying multiple objects on top of the fishing rods which can become quite burdensome. It is well-known that tackle, bait, food, beverage and a greater convenience for sitting are all highly desired on any fishing trip beyond casual. The conventionality of today is to carry a cooler for food and beverage, a bait container for live or frozen bait, a tackle box, and sometimes a portable stool of some type. This becomes a very cumbersome load to bear for any length of time.

Thus, it is clearly demonstrated a need to fully utilize all desired accouterments with substantial container reduction thereby increasing comfort and mobility. Current methods and equipment don't provide for a one unit fishing trip.

III. SOLUTION TO PROBLEM

The present invention condenses the prior mentioned conditions into one unit consolidation. The one unit is composed of four altruistic components. These consist of a large cylindrical container with interior protrusions on sides and bottom. These side protrusions act as hangers and spacers while bottom protrusions act as partitioned multi geometrical storage space. A smaller cylindrical center console hollow in the center with quadular compartments around its seats in center of large cylinder. The hollow center would more desirably accommodate longer, more slender fishing accouterments while quadular compartments can stowe smaller paraphernalia. Lid/seat (high density waterproof foam affixed to lid) secures itself to top of large cylinder via a quarter turn accomplished by the pitch of threading on large cylinder and lid/seat. Encompassing the outside of large cylinder are the semi-circular cargo compartments with removable partitions. Cargo compartments are connected to one another via over center snap strap which also fastens them to the outside of large cylinder by means of over center snap. Desired items of storage more appropriate would be bait, food, beverage and spare reel.

Both the large cylinder and center console have handles for transport and removal respectively.

SUMMARY OF INVENTION

The function of this invention now disclosed is to organize and convenience the necessary items required for a more load-free fishing trip.

The concept evolved around the necessity of carrying multiple containers on fishing trips in order to secure tackle, bait, food, beverage, and with lots of walking a place to sit.

This invention combines the five previously mentioned conditions and incorporates them into one more manageable apparatus. The five-in-one tackle mate organizes tackle of most types for the fisherman desiring ease and mobility. It has ample space for tackle, bait, food, beverage and a place to sit. Storage of tackle can mainly, but not solely, be achieved in large cylinder via side and bottom protrusions, center console via hollow center and surrounding compartments. The exterior cargo compartments encompassing the large cylinder are primarily intended for, but not exclusively, to be held to the storage of bait, food, and beverage.

Topping off the unit is a lid/seat. The lid/seat with quarter turn threads, threads on top of large cylinder, thereby securing itself to the large cylinder via a quarter turn. Fixed on top is a high density waterproof foam pad for seating. Whole unit is transported via handle connected to large cylinder.

BRIEF DESCRIPTION OF DRAWING

FIG. 9 depicts quarter turn lid/seat fastening style to top of large cylinder.

FIGS. 10–13 of 17, emphasize center console removed from large cylinder.

FIGS. 10, 11 are side views, 90 degrees opposed emphasizing hinge and snap style and compartments with and without partitions.

FIG. 12 is a cross sectional emphasizing hollow center with floor.

FIG. 13 is a top view.

FIG. 14 is side view depicting over center snap and one lid open.

FIG. 15 depicts one left side lid open, over center snap partially snapped, and on right side, no lids present exposing partition of compartment.

FIG. 16 is side view, 90 degrees opposed to over center snap strap depicting one lid open.

DETAILED DESCRIPTION OF THE PREFERRED EMBODIMENT

Figure 1:
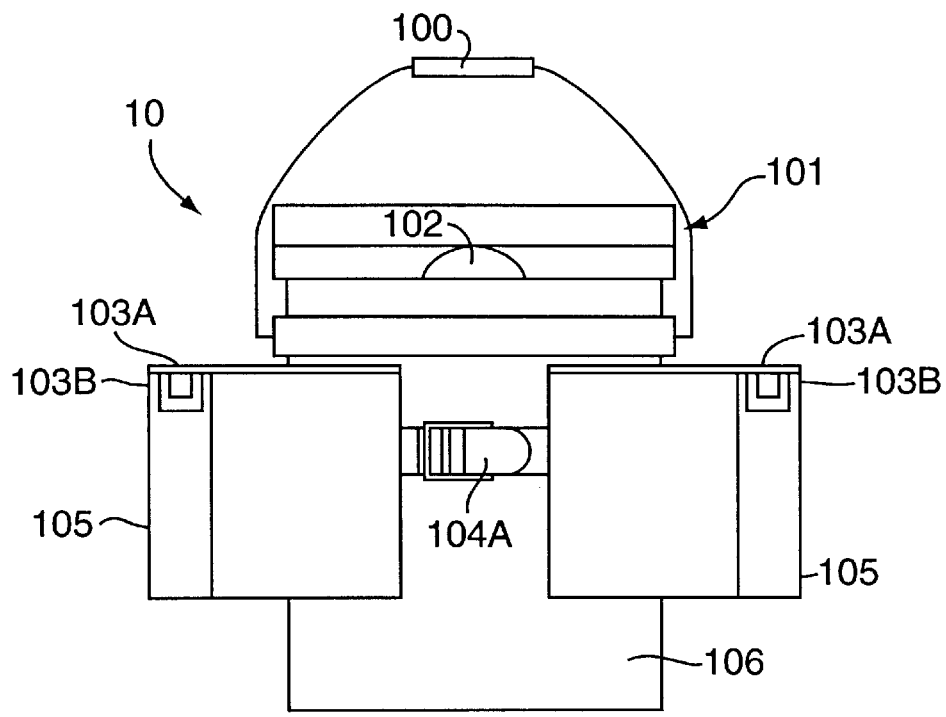
FIGS. 1–4 of 17, illustrates the overall complete unit emphasizing non-repetitive views.

Referring to FIG. 1, a multi-purpose container generally designated by the reference numeral 10 is shown and comprises a—, please delete "bears large cylinder" and substitute—attached to a primary receptacle—, and please delete "which" and substitute—. In the preferred embodiment a pair of carrying handle 100 bears large cylinder 106 which cargo compartments 105 are removably attached via over center snap strap 104A to the primary receptacle. Lid/seat 101 is removably fastened to a top section of the primary receptacle and defines a handle 102 integrally cast. 103B is fastening device for cargo compartment lid 103A.

Figure 5:
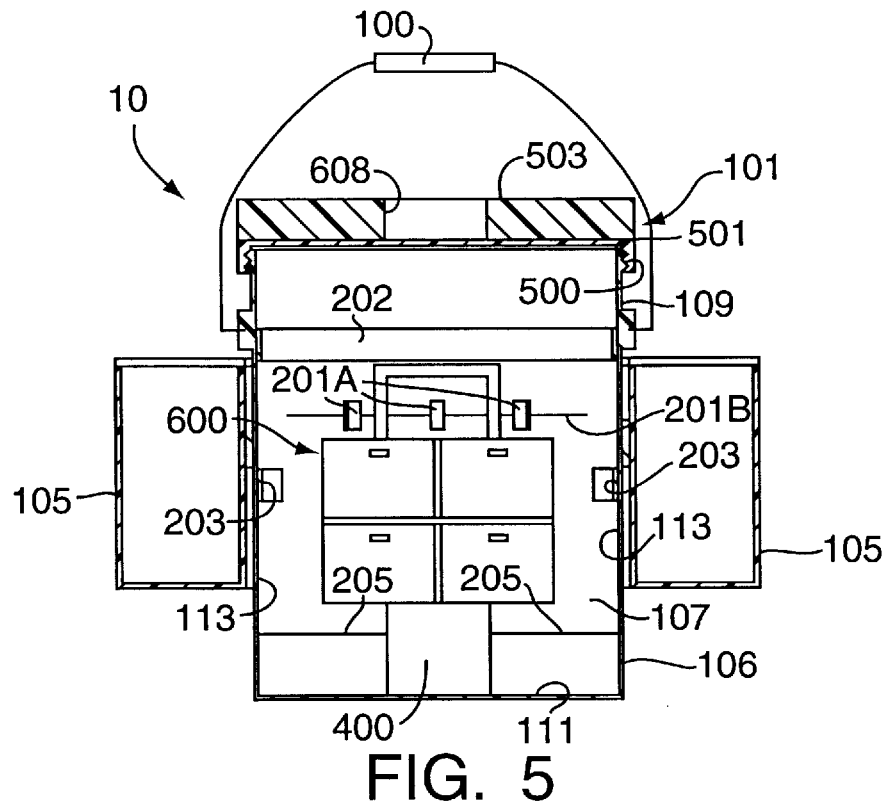
FIGS. 5, 6 of 17 are cross sectional, 90 degrees opposed emphasizing placement of center console and interior protrusions of completely assemble unit.

As shown in FIG. 5, the primary receptacle 106 defines an interior area 107, and also includes a top portion 109, a bottom surface 111 and upstanding side walls 113 extending from the bottom surface 111, each having an interior and an exterior surface.

Figure 2:
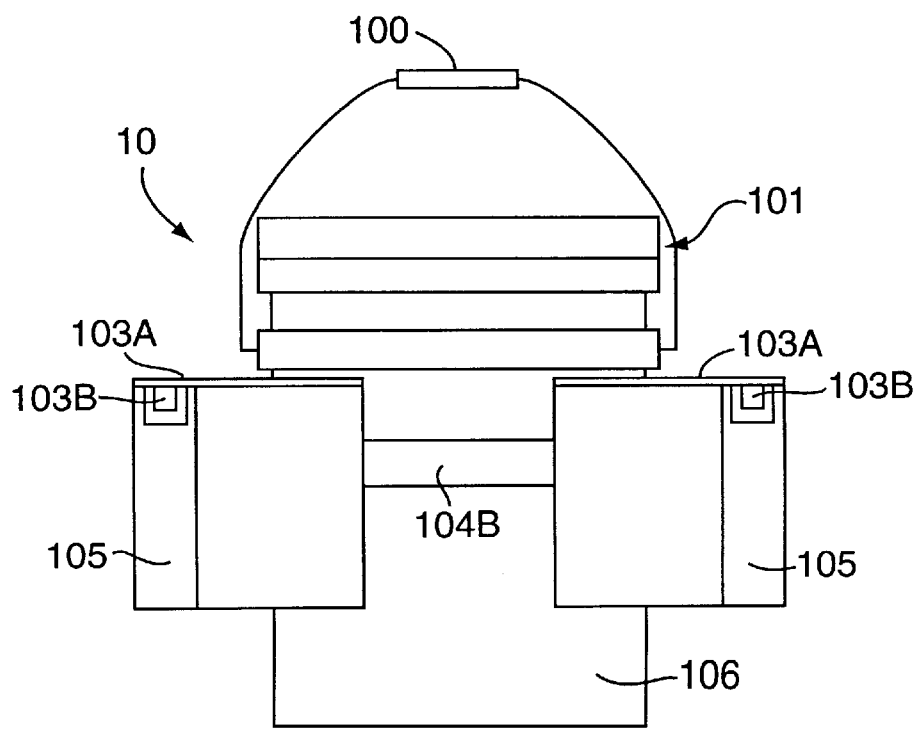

FIG. 2 is 180 degrees opposed of FIG. 1. Notice no over-center snap 104A, only strap 104B. Integrated cast handle 102 is not visible. Everything else is identical.

Figure 3:
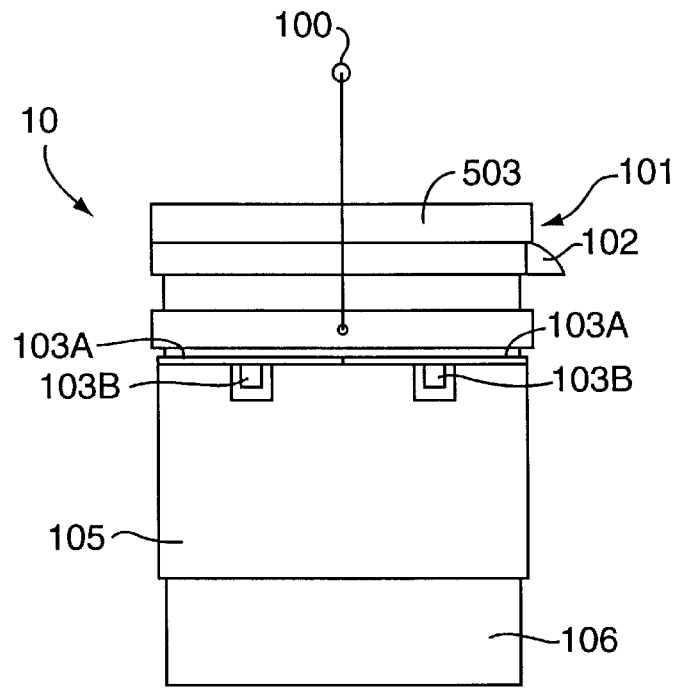

FIG. 3 is 90 degrees opposed FIG. 1, 2. This depiction has cargo compartments 105 broadside. Again, carrying handle 100 bears large cylinder 106 encompassed by cargo compartments 105 and their lids 103A secured via latch 103B. Unit is topped off with lid/seat 101 portraying integral cast handle 102 from a side view.

Figure 4:
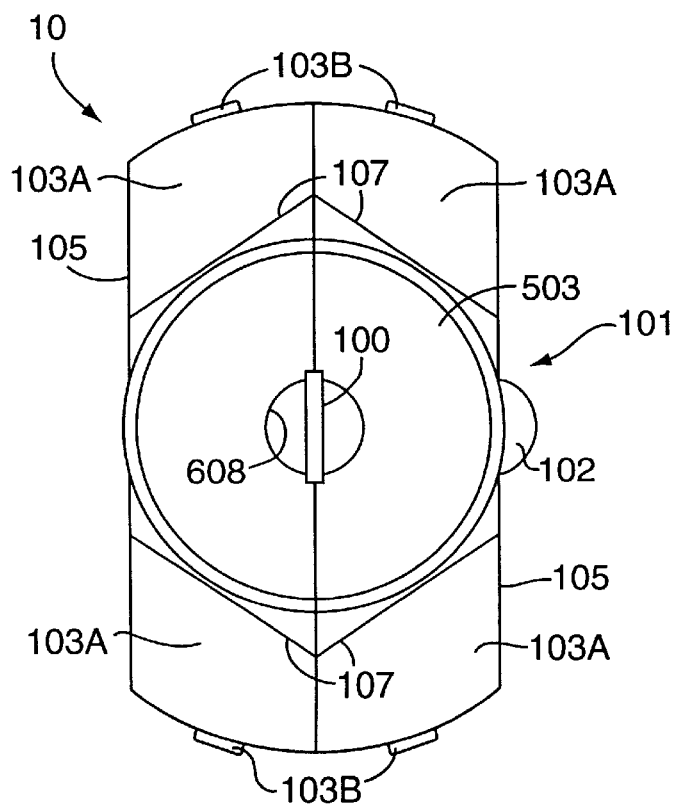

FIG. 4 is top view of complete assembly that's parallel with FIG. 3. 100 carrying handle is over top of lid/seat 101 in a semi-circular manner as depicted in FIG. 1, 2. Cargo compartments 105 are 180 degrees opposed as depicted in all previous figures topped with lids 103A fastened down via latches 103B. Note live hinge 107 that allows for quadry circular motion of lids to open and close. 102 integrally cast handle of 101 lid/seat.

FIG. 5 is a cross sectional view with carrying handle 100 broadside. Now exposed the one inch corrugated band 202 goes around interior area 203 of the primary receptacle 106 approximately a half inch from top of primary receptacle 106. At right angles to the wall of primary receptacle 106 approximately three and a half inches down from top of primary receptacle 106 are one inch by one inch protrusions 201A having slots down from the top of one inch by one inch protrusions to hole in center. Extending through the holes and attached at predetermined locations to the interior surfaces of the side walls 113 wall is an elastic member 201B. The elastic member 201B defines a plurality of free spans for elasticly retaining items inserted between the elastic member and the side walls 113. Below one inch corrugated band 202 approximately four inches and at 90 degrees to one inch by one inch protrusions 201A is two one inch corrugated bands 203 approximately five inches long around interior circumference of large cylinder 106. In center is center console 600 with handle broadside. The internal protrusions 205 extend up from bottom surface and side walls of primary receptacle 106 approximately two inches to form a receptacle for center console and non lidded compartments.

Figure 6:
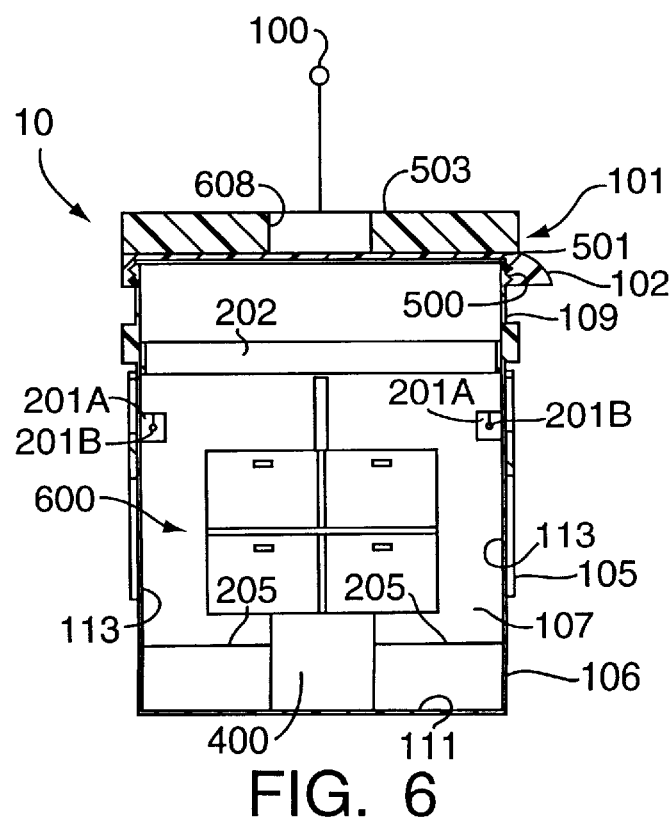

FIG. 6 is cross sectional 90 degrees, opposed to FIG. 5 giving a different geometric perspective of one inch by one inch protrusions 201A better exemplifying the downward slot and hole in center. Small horizontal line from hole in center of one inch by one inch protrusion 201A depicts elastic 201B. Notice one inch corrugated band 203 in FIG. 5, five inches long isn't visible, but it's there behind center console 600. All other interior depictions are the same as in FIG. 5.

Figure 7:
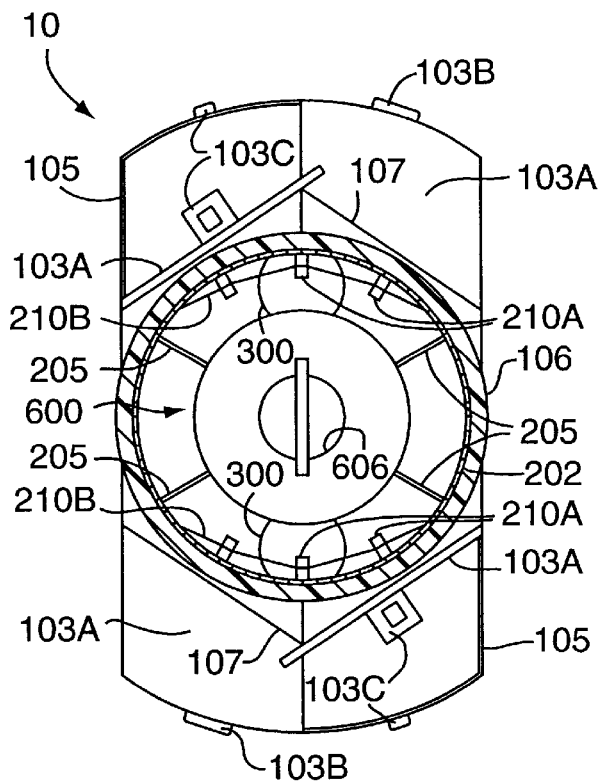
FIG. 7 is a top view lid/seat removed, two cargo compartments open emphasizing center console and internal protrusions.

FIG. 7 is a top view with lid/seat removed and two cargo compartments open. Now more defined is the placement of center console 600 in relation to bottom and side interior protrusions 300, 205, 203, 202 and 201A respectively. Configuration of circular protrusions 300 and straight protrusions 205 are now more clear and are approximately two inches tall from bottom. One inch corrugated band 202 can be seen around the whole interior circumference of large cylinder 106 and is approximately a half inch down from top of primary receptacle 106. One inch corrugated bands 203 which there are two of five inches long are also along interior surfaces of the upstanding side walls 113 of the primary receptacle 106 90 degrees opposed to one inch by one inch protrusions 201A and are down approximately four inches from previous mentioned corrugated band 202.

one inch by one inch protrusions 201A can be seen extending themselves beyond interior surfaces of the upstanding side walls 113 of the primary receptacle 106 180 degrees of one another and 90 degrees opposed to two one inch bands 203, down approximately three and a half inches from top of large cylinder 106. Through center holes in one inch by one inch protrusions 201A runs the elastic 201B affixed at both ends to interior of primary receptacle 106. Cargo compartments lid 103A is shown full open and denotes latching mechanism 103C unlatched versus a latched view of 103B. Quasi circular motion, for opening and closing lid is accomplished by live hinges 107.

Figure 8:
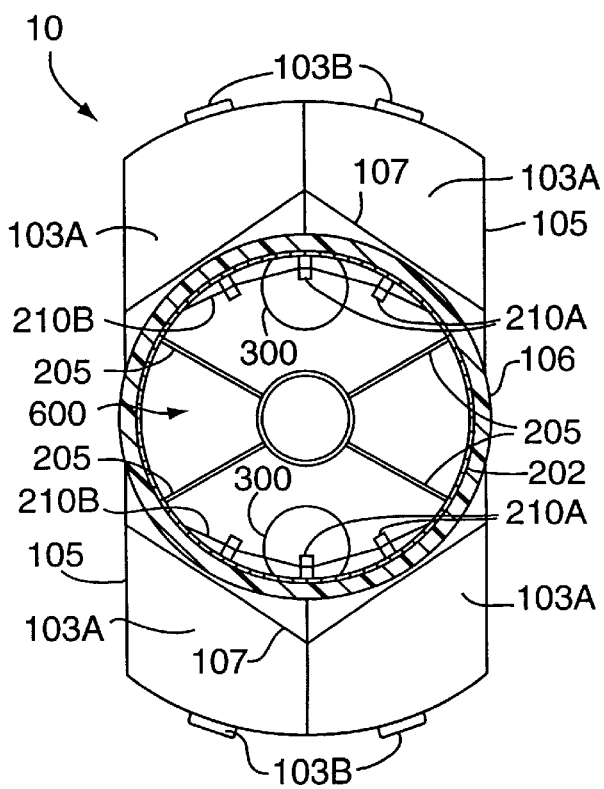
FIG. 8 is a top view lid/seat and center console removed emphasizing full view of internal protrusions.

In FIG. 8, a top view center console is removed and cargo compartment lids 103A are closed. With center console now removed, center circular protrusion 400 is visible providing a receptacle for base of center console and as with other protrusions from bottom is approximately two inches tall. Also completely exposed now are circular and straight protrusions 300, 205 respectively giving their full geometric depiction. The rest of FIG. 8 is the same as stated in FIG. 7 and need not be repetitious.

FIG. 9 is the relation of lid/seat 101 to large cylinder 106 being fastened via quarter turn threads. Accordingly, the top portion 109 of the primary receptacle 106 defines external quarter-turn threads 500, and the lid/seat 101 defines mating internal quarter-turn threads 501 for fastening the lid to the primary receptacle 106. Top line of 101 points to cushion 503 attached to the lid/seat 101 and bottom line to lid with integral cast handle 102.

FIG. 10 illustrates center console 600 totally removed from the rest of apparatus. Handle 601 Broadside depicts a view such that two closed blunt pie shaped compartments 602 are visible along with two blunt pie shaped compartments open 604. Notice no removable partitions in 604. The fastening of closed blunt pie shaped compartments 602, 604 to base cabinet of center console 600 is depicted in Inset A via oversized view of snap latch. Large center base and smaller balance legs 603 stabilize center console unit when out of primary receptacle 106. Base 608 is received by circular protrusion 400 in FIG. 8 when center console 600 is placed in large cylinder.

FIG. 11 is 90 degrees opposed to FIG. 10. Notice handle 601 is narrow profile. Blunt pie shaped compartments 605 are opened to reveal installed removable partitions which can be installed/removed from any of the blunt pie shaped compartments 602, 605 and 604 in FIG. 10. Inset B expands view of divot hinge which snap fastens all blunt pie shaped compartments 602, 605, and 604 in FIG. 10 to base cabinet center console 600 allowing for quadry circular open and close motion. All other visualizations of FIG. 11 are identical to that of FIG. 10 to save repetitiveness.

Figure 12:
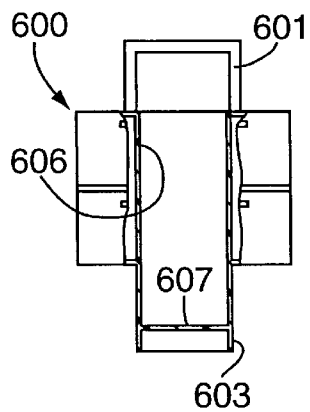

FIG. 12 is a cross sectional of center console 600 with handle 601 broadside. Area 606 denotes a cylindrical bore 606 with floor 607 to accommodate larger slender fishing accouterments. Large center base and balance legs 603 are same as mentioned previously.

Figure 13:
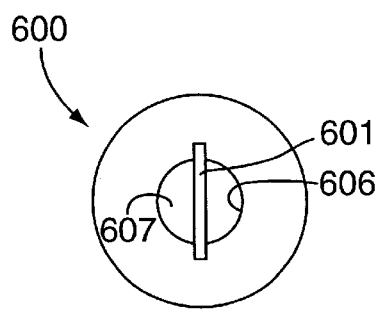

FIG. 13 is top view of center console 600 depicting handle 601, hollow cylindrical center and floor 606, 607 respectively.

Figure 14:
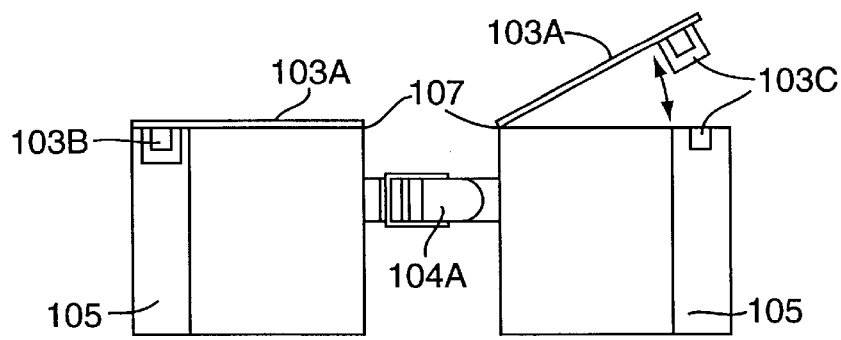
FIGS. 14–17 of 17, illustrates cargo compartments removed from large cylinder via over center snap strap for ease of differentiation.
Figure 15:
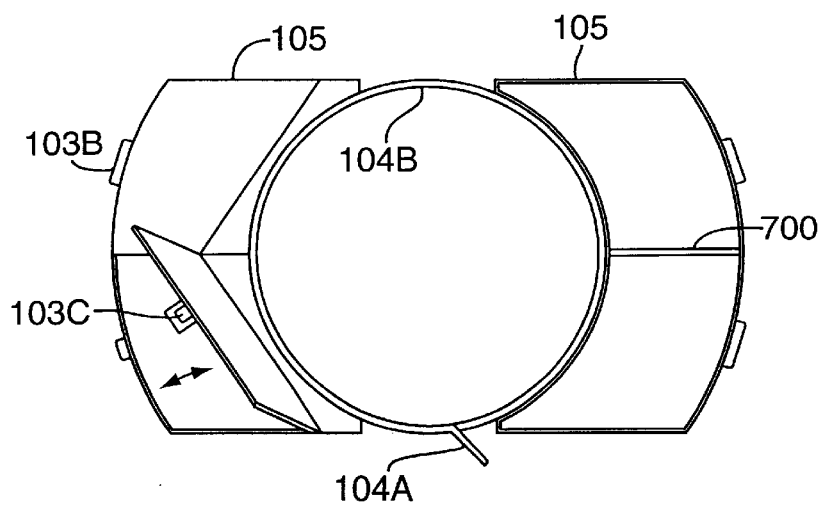
Figure 16:
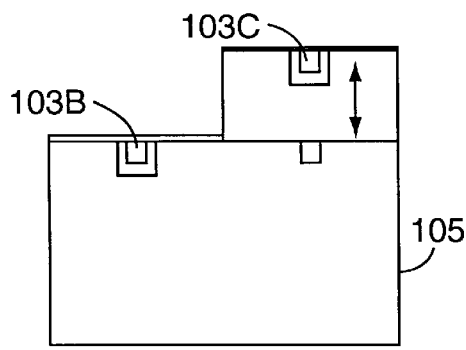

FIGS. 14–16 of 17 illustrates cargo compartments removed from large cylinder for ease of differentiation and separability. This characteristic necessitated itself from the need to clean compartments after bait storage. In FIG. 14 both cargo compartments 105 are connected via over center snap strap 104A, 180 degrees opposed but not visible is strap 104B. Lids 103A move in a quadry circular motion to open and close via live hinges 107. Cargo compartments 105 fastening to lid 103A is accomplished via latch 103B in closed position and 103C in the half open position.

FIG. 15 is top view of cargo compartments 105 connected 180 degrees opposed of one another via over center snap and strap 104A, 104B respectively. One lid 103C is depicted half open while 103B depicts lid closed. Right side cargo compartments 105 has no lids exposing interior removable partition 700 installed which option exists for both cargo compartments 105.

FIG. 16 is cargo compartments 105 broadside. 180 degrees opposite is identical perspective. Cargo compartment 105 is depicted with left lid closed, 103B and right lid half open 103C.

Figure 17C:
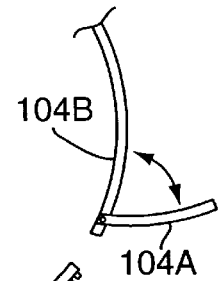
FIGS. 17C and D are oversized views of over center snap and lid latching mechanism.
Figure 17D:
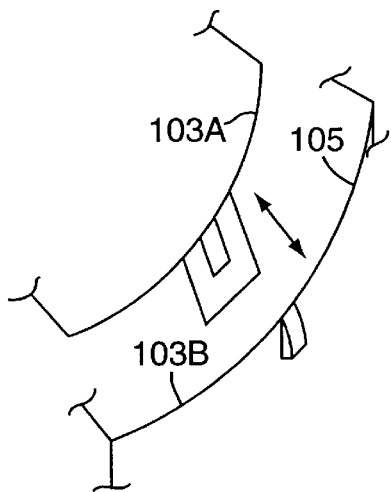

FIGS. 17C-D are oversized views of fastening devices of the cargo compartments. In 17C the strap 104B that holds cargo compartments 180 degrees opposed to one another is shown partially fastened via over center snap 104A. Snap depicted is adjustable for varying size circumferences. In D lid, 103A is partially open from cargo compartment 105 to depict both halves of latching mechanism 105B.

Figure 18:
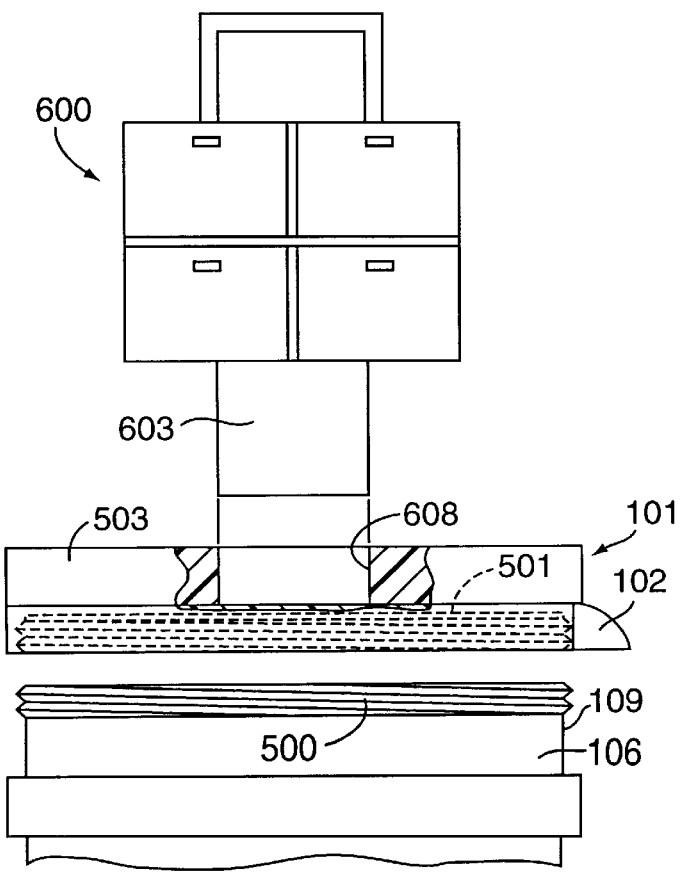
FIG. 18 is a partially exploded front elevational view showing the cooperation of the lid/seat and the center console of the multi-purpose container of FIG. 1.

As shown in FIG. 18, the cushion 503 coupled to the lid/seat 101, defines an aperture 608 extending therethrough for receiving and releasably retaining the base support of the center console 600. Accordingly, when the center console 600 is removed from the multi-purpose container, it can be supported by the lid/seat 101 and the cushion 503 to provide convenient access to the console.

A number of variations in design of disclosed invention in FIGS. 1–17 of 17 can be created. For example, the large cylinder 105 and its internal protrusions, center console 600 and its compartments 602, 604, 605, cargo compartments 105 and its accompanying over center snap strap 104A, 104B, and lid/seat 101 may be of any suitable design that would allow functionality to be rendered.

The present invention is not to be limited to the design shown in FIGS. 1–17 of 17. Indeed, while indicated geometric progressions, fasteners fixed or allowing motion are desired, it is to be understood that any desirable geometric progression, fastener fixed or allowing motion could be utilized, such as squares, ovals, rectangles, triangles, or any other shape that would accomplish functionality, henceforth and including fasteners fixed or allowing motion. Furthermore, any exacting details to dimensions in disclosed invention were solely used for the ease of communicating the correlation between written explanation and pictorial presentation and have no bearing on the final outcome of disclosed invention. Any dimensions will be selected on accomplishing functionality, durability, and production. Let it not be misconstrued that any suggestions of placement of any of mentioned fishing tackle or other desireable needs be allocated to mentioned areas as these were merely preference of the inventor. Any manner of allocation of tackle and other desireables to any given perspective of invention is solely the discretion of the individual and their capacity to create functionality. It is hereby to be understood that the disclosed invention may or may not be composed of multiple type materials. The matter of composition will be selected on conditions of environmental stress and production factors. All of these variations and any others which serves to perform the disclosed invention FIGS. 1–17 of 17's ability to consolidate the five functions of tackle, bait, food, beverage, and seating accommodations into one manageable mobile unit will suffice.

I claim:

1. A multi-purpose container comprising:

a primary receptacle defining an interior area, and including a top portion, a bottom surface defining a protrusion, and an upstanding side wall extending from the bottom surface, the side wall having interior and exterior surfaces;

at least one compartment releasably connected to the exterior surface of the side wall;

a center console including a base releasably supported within the protrusion for retaining the console within the interior area, the console defining a plurality of radially projecting compartments and a central bore having a floor for supporting items placed in the bore;

a lid releasably fastened to the top section of the primary receptacle for enclosing the interior area; and a cushion attached to the lid, thereby providing a seat, said cushion defining an aperture extending therethrough for releasably retaining the base of the center console when the console is removed from the primary receptacle.

2. A multi-purpose container as defined by claim 1, wherein:

the top portion of the primary receptacle defines external quarter turn threads; and the lid defines internal mating quarter turn threads for fastening the lid to the primary receptacle.

3. A multi-purpose container as defined by claim 1, wherein the lid defines a handle.

4. A multi-purpose container as defined by claim 1, further comprising an elastic member positioned in the interior area and attached at predetermined locations, to the interior surfaces of the side walls, thereby defining a plurality of free spans for elastically retaining items against the side walls.

5. A multi-purpose container as defined by claim 4, further comprising:

a plurality of protrusions extending from the side walls into the interior area, each defining a slot; and wherein the elastic member extends through the slots.

6. A multi-purpose container as defined by claim 1, wherein the at least one compartment is removably attached to the primary receptacle by an adjustable length strap extending around the exterior surface of the primary receptacle.

7. A multi-purpose container comprising:

a primary receptacle having an interior area, a top portion, a bottom surface, and upstanding side walls extending from the bottom surface, each side wall having interior and exterior surfaces;

a center console defining a plurality of compartments, and having a handle and a base portion, the center console being located in the interior area and releasably supported by the bottom surface of the primary receptacle;

the bottom surface defining a circular protrusion extending therefrom for receiving the base portion of the center console, thereby retaining it in the primary receptacle;

a lid releasably fastened to the top section of the primary receptacle for enclosing the interior area;

a cushion attached to the lid, providing a seat; and an elastic member positioned in the interior area and attached at predetermined locations to the interior surfaces of the side walls, thereby defining a plurality of free spans for elastically retaining items against the side wall.

8. A multi-purpose container as defined by claim 7, further comprising:

a plurality of protrusions extending from the side walls into the interior area, each defining a slot; and wherein the elastic member extends through the slots.

9. A multi-purpose container comprising:

a primary receptacle defining an interior area, and including a top portion defining external quarter turn threads, a bottom surface defining a protrusion, and upstanding side walls extending from the bottom surface, each side wall having interior and exterior surfaces;

at least one compartment releasably connected to the exterior surface of at least one of the side walls;

a lid defining mating internal quarter turn threads releasably coupled to the external quarter turn threads for fastening the lid to the top section of the primary receptacle, thereby enclosing the interior area;

a center console including a base receivable within the protrusion for retaining the console within the interior area located in the interior area and releasably supported by the bottom surface of the primary receptacle; and a cushion attached to the lid, providing a seat, the cushion defining an aperture extending therethrough for releasably retaining the base of the center console when the console is removed from the primary receptacle.

10. A multi-purpose container as defined by claim 5, wherein the lid defines a handle.

11. A multi-purpose container as defined by claim 5, further comprising an elastic member positioned in the interior area and attached at predetermined locations, to the interior surfaces of the side walls, thereby defining a plurality of free spans for elastically retaining items against the side walls.

12. A multi-purpose container as defined by claim 9, wherein the center console defines a plurality of compartments.

13. A multi-purpose container comprising:

a primary receptacle defining an interior area, and including a top portion defining external quarter turn threads, a bottom surface, and upstanding side walls extending from the bottom surface, each side wall having interior and exterior surfaces;

at least one compartment releasably connected to the exterior surface of at least one of the side walls;

a lid defining mating internal quarter turn threads releasably coupled to the external quarter turn threads for fastening the lid to the top section of the primary receptacle, thereby enclosing the interior area; and a cushion attached to the lid, providing a seat;

an elastic member positioned in the interior area and attached at predetermined locations to the interior surfaces of the side walls, thereby defining a plurality of free spans for elastically retaining items against the side walls; and a plurality of protrusions extending from the side walls into the interior area, each defining a slot; and wherein the elastic member extends through the slots.

14. A multi-purpose container comprising:

a primary receptacle defining an interior area, and including a top portion defining external quarter turn threads, a bottom surface, and upstanding side walls extending from the bottom surface, each side wall having interior and exterior surfaces;

at least one compartment releasably connected to the exterior surface of at least one of the side walls;

a lid defining mating internal quarter turn threads releasably coupled to the external quarter turn threads for fastening the lid to the top section of the primary receptacle, thereby enclosing the interior area; and a cushion attached to the lid, providing a seat;

a center console located in the interior area and releasably supported by the bottom surface of the primary receptacle, the bottom surface defining a protrusion, and wherein the center console includes a base receivable within the protrusion for retaining the console within the interior area.

* * * * *